United States Patent
Roy et al.

(10) Patent No.: US 10,838,783 B1
(45) Date of Patent: Nov. 17, 2020

(54) DATA MANAGEMENT SYSTEM AND METHOD

(71) Applicant: EMC IP Holding Company, LLC, Hopkinton, MA (US)

(72) Inventors: Amit Roy, Lexington, MA (US); Ying Xie, Harvard, MA (US); Rajesh Gandhi, Shrewsbury, MA (US); Norman Speciner, Medway, MA (US); Daniel Stanton Keefe, Walpole, MA (US); Ken Kim, Worcester, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 228 days.

(21) Appl. No.: 15/664,238

(22) Filed: Jul. 31, 2017

(51) Int. Cl.
*G06F 9/54* (2006.01)
*G06F 9/48* (2006.01)

(52) U.S. Cl.
CPC ............ *G06F 9/542* (2013.01); *G06F 9/4881* (2013.01)

(58) Field of Classification Search
CPC ............................... G06F 9/542; G06F 9/4881
See application file for complete search history.

(56) References Cited

U.S. PATENT DOCUMENTS

| | | | | |
|---|---|---|---|---|
| 6,847,970 | B2 * | 1/2005 | Keller | G06F 11/008 |
| 10,671,597 | B1 * | 6/2020 | Roy | G06F 16/285 |
| 2010/0095268 | A1 * | 4/2010 | Lowry | G06Q 10/10 |
| | | | | 717/102 |
| 2017/0017677 | A1 * | 1/2017 | Jolfaei | G06F 16/2358 |

* cited by examiner

Primary Examiner — Doon Y Chow
Assistant Examiner — Kimberly L Jordan
(74) Attorney, Agent, or Firm — Brian J. Colandreo; Mark H. Whittenberger; Holland & Knight LLP

(57) ABSTRACT

A method, computer program product, and computing system for determining, at the computing device, one or more dependencies associated with a plurality of managed objects and a plurality of backend objects. One or more backend notifications associated with one or more backend objects of the plurality of backend objects may be received. One or more managed objects of the plurality of managed objects associated with the one or more backend objects of the one or more backend notifications may be identified, based upon, at least in part, the one or more dependencies associated with the plurality of managed objects and the plurality of backend objects. The one or more identified managed objects of the plurality of managed objects may be updated based upon, at least in part, the one or more backend notifications.

17 Claims, 5 Drawing Sheets

DATA MANAGEMENT SYSTEM AND METHOD

BACKGROUND

Storage systems may include various hardware components (e.g., storage processors, disk drives, and power supplies). These storage systems may provide services over multiple network connections that expose different protocols. Many resources (e.g., storage pools, LUNs, file systems) may be created, monitored and modified within these storage systems.

SUMMARY OF DISCLOSURE

In one example implementation, a computer-implemented method is executed on a computing device and may include but is not limited to determining, at the computing device, one or more dependencies associated with a plurality of managed objects and a plurality of backend objects. One or more backend notifications associated with one or more backend objects of the plurality of backend objects may be received. One or more managed objects of the plurality of managed objects associated with the one or more backend objects of the one or more backend notifications may be identified, based upon, at least in part, the one or more dependencies associated with the plurality of managed objects and the plurality of backend objects. The one or more identified managed objects of the plurality of managed objects may be updated based upon, at least in part, the one or more backend notifications.

One or more of the following example features may be included. Determining the one or more dependencies may include determining one or more dependencies associated with a plurality of managed object types and a plurality of backend object types from one or more applications associated with the plurality of managed object types. Identifying one or more managed objects may include identifying one or more managed object types of the plurality of managed object types associated with one or more backend object types of the one or more backend notifications based upon, at least in part, the one or more dependencies associated with the plurality of managed object types and the plurality of backend object types. Identifying one or more managed objects may include routing the one or more backend notifications associated with the one or more backend objects to a plurality of task managers associated with the identified one or more managed object types. Identifying the one or more managed objects may include associating one or more managed objects of the plurality of managed objects with one or more backend objects of the plurality of backend objects based upon, at least in part, the business logic associated with the plurality of managed objects. Determining the one or more dependencies may be based upon, at least in part, business logic from one or more applications associated with the plurality of managed objects. Updating the one or more identified managed objects may include generating one or more tasks for the one or more identified managed objects of the plurality of managed objects based upon, at least in part, business logic from one or more applications associated with the identified managed objects of the plurality of managed objects. The one or more dependencies may include one or more of dependencies between at least one managed object of the plurality of managed objects and at least one backend object of the plurality of backend objects, dependencies between at least two managed objects of the plurality of managed objects, and dependencies between at least two backend objects of the plurality of backend objects.

In another example implementation, a computer program product resides on a computer readable medium that has a plurality of instructions stored on it. When executed across one or more processors, causes at least a portion of the one or more processors to perform operations that may include but are not limited to determining one or more dependencies associated with a plurality of managed objects and a plurality of backend objects. One or more backend notifications associated with one or more backend objects of the plurality of backend objects may be received. One or more managed objects of the plurality of managed objects associated with the one or more backend objects of the one or more backend notifications may be identified, based upon, at least in part, the one or more dependencies associated with the plurality of managed objects and the plurality of backend objects. The one or more identified managed objects of the plurality of managed objects may be updated based upon, at least in part, the one or more backend notifications.

One or more of the following example features may be included. Determining the one or more dependencies may include determining one or more dependencies associated with a plurality of managed object types and a plurality of backend object types from one or more applications associated with the plurality of managed object types. Identifying one or more managed objects may include identifying one or more managed object types of the plurality of managed object types associated with one or more backend object types of the one or more backend notifications based upon, at least in part, the one or more dependencies associated with the plurality of managed object types and the plurality of backend object types. Identifying one or more managed objects may include routing the one or more backend notifications associated with the one or more backend objects to a plurality of task managers associated with the identified one or more managed object types. Identifying the one or more managed objects may include associating one or more managed objects of the plurality of managed objects with one or more backend objects of the plurality of backend objects based upon, at least in part, the business logic associated with the plurality of managed objects. Determining the one or more dependencies may be based upon, at least in part, business logic from one or more applications associated with the plurality of managed objects. Updating the one or more identified managed objects may include generating one or more tasks for the one or more identified managed objects of the plurality of managed objects based upon, at least in part, business logic from one or more applications associated with the identified managed objects of the plurality of managed objects. The one or more dependencies may include one or more of dependencies between at least one managed object of the plurality of managed objects and at least one backend object of the plurality of backend objects, dependencies between at least two managed objects of the plurality of managed objects, and dependencies between at least two backend objects of the plurality of backend objects.

In another example implementation, a computing system includes one or more processors and one or more memories configured to perform operations that may include but are not limited to determining one or more dependencies associated with a plurality of managed objects and a plurality of backend objects. One or more backend notifications associated with one or more backend objects of the plurality of backend objects may be received. One or more managed objects of the plurality of managed objects associated with the one or more backend objects of the one or more backend notifications may be identified, based upon, at least in part, the one or more dependencies associated with the plurality of managed objects and the plurality of backend objects. The one or more identified managed objects of the plurality of managed objects may be updated based upon, at least in part, the one or more backend notifications.

One or more of the following example features may be included. Determining the one or more dependencies may include determining one or more dependencies associated with a plurality of managed object types and a plurality of backend object types from one or more applications associated with the plurality of managed object types. Identifying one or more managed objects may include identifying one or more managed object types of the plurality of managed object types associated with one or more backend object types of the one or more backend notifications based upon, at least in part, the one or more dependencies associated with the plurality of managed object types and the plurality of backend object types. Identifying one or more managed objects may include routing the one or more backend notifications associated with the one or more backend objects to a plurality of task managers associated with the identified one or more managed object types. Identifying the one or more managed objects may include associating one or more managed objects of the plurality of managed objects with one or more backend objects of the plurality of backend objects based upon, at least in part, the business logic associated with the plurality of managed objects. Determining the one or more dependencies may be based upon, at least in part, business logic from one or more applications associated with the plurality of managed objects. Updating the one or more identified managed objects may include generating one or more tasks for the one or more identified managed objects of the plurality of managed objects based upon, at least in part, business logic from one or more applications associated with the identified managed objects of the plurality of managed objects. The one or more dependencies may include one or more of dependencies between at least one managed object of the plurality of managed objects and at least one backend object of the plurality of backend objects, dependencies between at least two managed objects of the plurality of managed objects, and dependencies between at least two backend objects of the plurality of backend objects.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
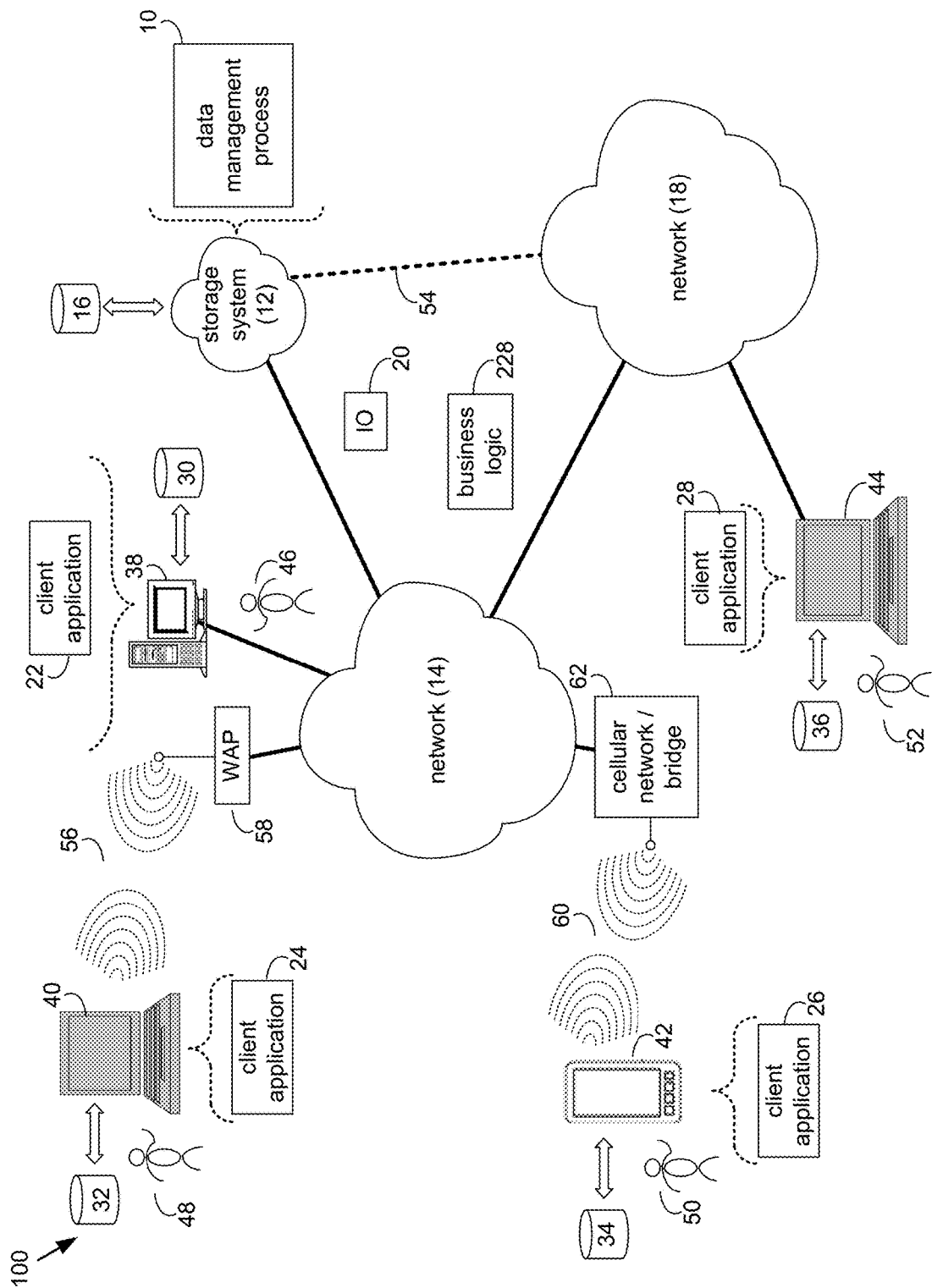
FIG. 1 is an example diagrammatic view of a storage system and a data management process coupled to a distributed computing network according to one or more example implementations of the disclosure.

System Overview:

Referring to the example implementation of FIG. 1, there is shown data management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data management process, such as data management process 10 of FIG. 1, may include but is not limited to, determining one or more dependencies associated with a plurality of managed objects and a plurality of backend objects. One or more backend notifications associated with one or more backend objects of the plurality of backend objects may be received. One or more managed objects of the plurality of managed objects associated with the one or more backend objects of the one or more backend notifications may be identified, based upon, at least in part, the one or more dependencies associated with the plurality of managed objects and the plurality of backend objects. The one or more identified managed objects of the plurality of managed objects may be updated based upon, at least in part, the one or more backend notifications.

For example purposes only, storage system 12 may be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
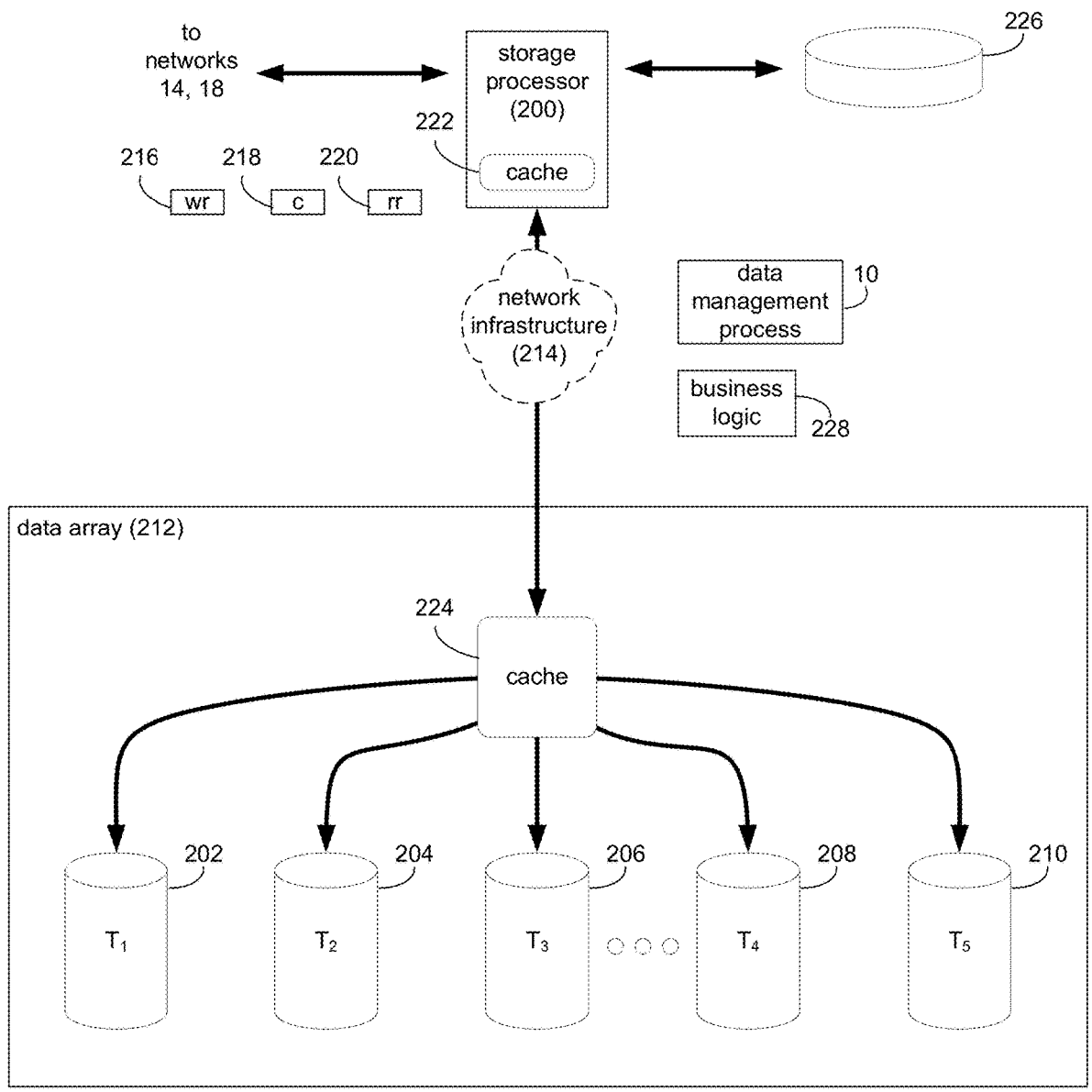
FIG. 2 is an example diagrammatic view of the storage system of FIG. 1 according to one or more example implementations of the disclosure.

Referring also to the example implementation of FIG. 2, storage system 12 may include storage processor 200 and a plurality of storage targets T1-$n$ (e.g., storage targets 202, 204, 206, 208). Storage targets 202, 204, 206, 208 may be configured to provide various levels of performance and/or high availability. For example, one or more of storage targets 202, 204, 206, 208 may be configured as a RAID 0 array, in which data is striped across storage targets. By striping data across a plurality of storage targets, improved performance may be realized. However, RAID 0 arrays do not provide a level of high availability. Accordingly, one or more of storage targets 202, 204, 206, 208 may be configured as a RAID 1 array, in which data is mirrored between storage targets. By mirroring data between storage targets, a level of high availability is achieved as multiple copies of the data are stored within storage system 12.

While storage targets 202, 204, 206, 208 are discussed above as being configured in a RAID 0 or RAID 1 array, this is for example purposes only and is not intended to be a limitation of this disclosure, as other configurations are possible. For example, storage targets 202, 204, 206, 208 may be configured as a RAID 3, RAID 4, RAID 5 or RAID 6 array.

While in this particular example, storage system 12 is shown to include four storage targets (e.g., storage targets 202, 204, 206, 208), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 210. As is known in the art, a coded target may be used to store coded data that may allow for the regeneration of data lost/corrupted on one or more of storage targets 202, 204, 206, 208. An example of such a coded target may include but is not limited to a hard disk drive that is used to store parity data within a RAID array.

While in this particular example, storage system 12 is shown to include one coded target (e.g., coded target 210), this is for example purposes only and is not intended to be a limitation of this disclosure. Specifically, the actual number of coded targets may be increased or decreased depending upon e.g., the level of redundancy/performance/capacity required.

Examples of storage targets 202, 204, 206, 208 and coded target 210 may include one or more electro-mechanical hard disk drives and/or solid-state/flash devices, wherein a combination of storage targets 202, 204, 206, 208 and coded target 210 and processing/control systems (not shown) may form data array 212.

The manner in which storage system 12 is implemented may vary depending upon e.g., the level of redundancy/performance/capacity required. For example, storage system 12 may be a RAID device in which storage processor 200 is a RAID controller card and storage targets 202, 204, 206, 208 and/or coded target 210 are individual "hot-swappable" hard disk drives. Another example of such a RAID device may include but is not limited to an NAS device. Alternatively, storage system 12 may be configured as a SAN, in which storage processor 200 may be e.g., a server computer and each of storage targets 202, 204, 206, 208 and/or coded target 210 may be a RAID device and/or computer-based hard disk drives. Further still, one or more of storage targets 202, 204, 206, 208 and/or coded target 210 may be a SAN.

In the event that storage system 12 is configured as a SAN, the various components of storage system 12 (e.g., storage processor 200, storage targets 202, 204, 206, 208, and coded target 210) may be coupled using network infrastructure 214, examples of which may include but are not limited to an Ethernet (e.g., Layer 2 or Layer 3) network, a fiber channel network, an InfiniBand network, or any other circuit switched/packet switched network.

Storage system 12 may execute all or a portion of data management process 10. The instruction sets and subroutines of data management process 10, which may be stored on a storage device (e.g., storage device 16) coupled to storage processor 200, may be executed by one or more processors (not shown) and one or more memory architectures (not shown) included within storage processor 200. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data management process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 200 is configured as an application server, these IO requests may be internally generated within storage processor 200. Examples of IO request 20 may include but are not limited to data write request 216 (i.e. a request that content 218 be written to storage system 12) and data read request 220 (i.e. a request that content 218 be read from storage system 12).

During operation of storage processor 200, content 218 to be written to storage system 12 may be processed by storage processor 200. Additionally/alternatively and when storage processor 200 is configured as an application server, content 218 to be written to storage system 12 may be internally generated by storage processor 200.

Storage processor 200 may include frontend cache memory system 222. Examples of frontend cache memory system 222 may include but are not limited to a volatile, solid-state, cache memory system (e.g., a dynamic RAM cache memory system) and/or a non-volatile, solid-state, cache memory system (e.g., a flash-based, cache memory system).

Storage processor 200 may initially store content 218 within frontend cache memory system 222. Depending upon the manner in which frontend cache memory system 222 is configured, storage processor 200 may immediately write content 218 to data array 212 (e.g., if frontend cache memory system 222 is configured as a write-through cache) or may subsequently write content 218 to data array 212 (e.g., if frontend cache memory system 222 is configured as a write-back cache).

Data array 212 may include backend cache memory system 224. Examples of backend cache memory system 224 may include but are not limited to a volatile, solid-state, cache memory system (e.g., a dynamic RAM cache memory system) and/or a non-volatile, solid-state, cache memory system (e.g., a flash-based, cache memory system). During operation of data array 212, content 218 to be written to data array 212 may be received from storage processor 200. Data array 212 may initially store content 218 within backend cache memory system 224 prior to being stored on e.g., one or more of storage targets 202, 204, 206, 208, and coded target 210.

As discussed above, the instruction sets and subroutines of data management process 10, which may be stored on storage device 16 included within storage system 12, may be executed by one or more processors (not shown) and one or more memory architectures (not shown) included within storage system 12. Accordingly, in addition to being executed on storage processor 200, some or all of the instruction sets and subroutines of data management process 10 may be executed by one or more processors (not shown) and one or more memory architectures (not shown) included within data array 212.

Further and as discussed above, during the operation of data array 212, content (e.g., content 218) to be written to data array 212 may be received from storage processor 200 and initially stored within backend cache memory system 224 prior to being stored on e.g., one or more of storage targets 202, 204, 206, 208, 210. Accordingly, during use of data array 212, backend cache memory system 224 may be populated (e.g., warmed) and, therefore, subsequent read requests may be satisfied by backend cache memory system 224 (e.g., if the content requested in the read request is present within backend cache memory system 224), thus avoiding the need to obtain the content from storage targets 202, 204, 206, 208, 210 (which would typically be slower).

Figure 3:
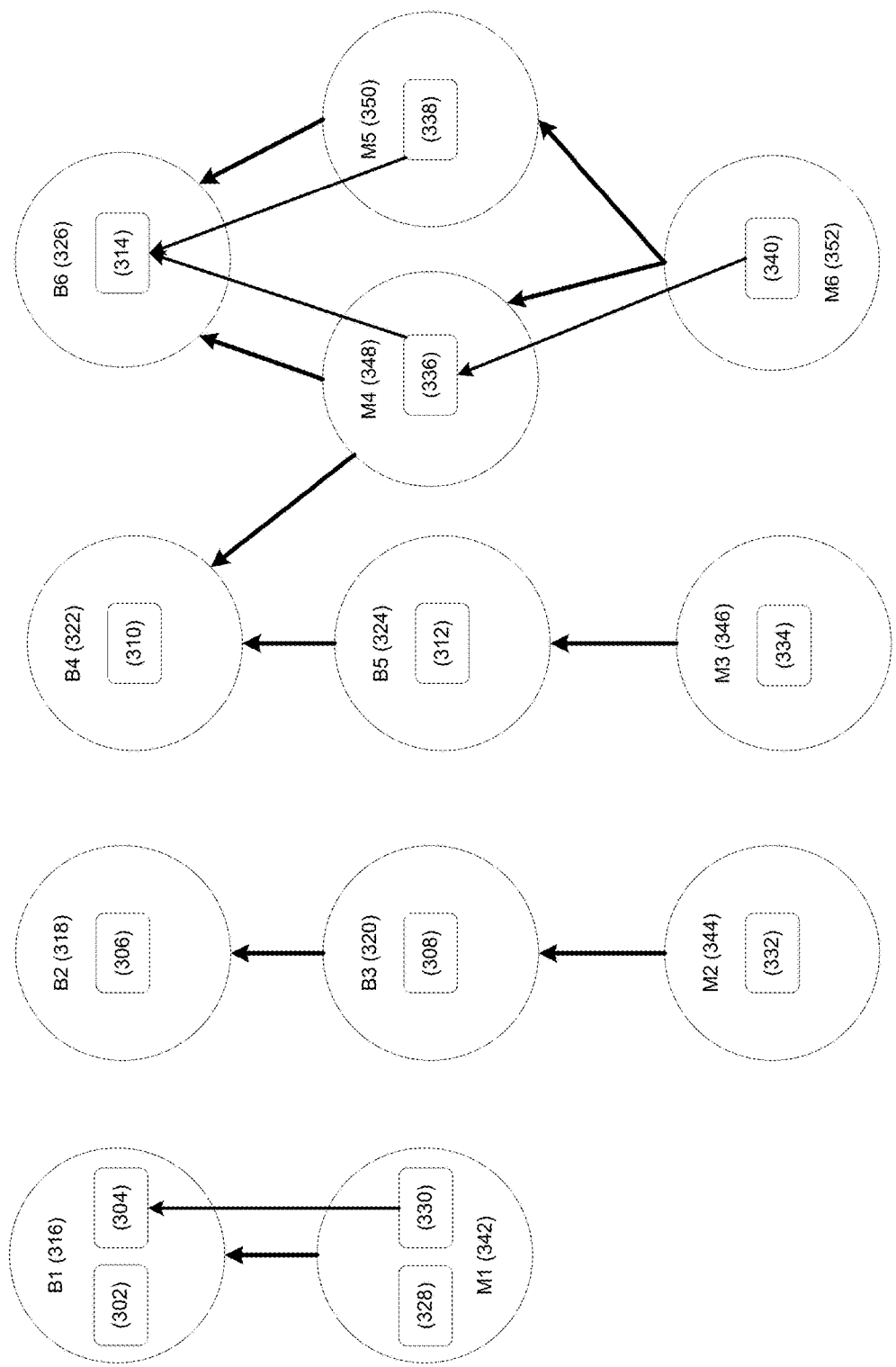
FIG. 3 is an example view of a dependency graph according to one or more example implementations of the disclosure.

Backend Data and Managed Data:

As discussed above and referring also to the example implementation of FIG. 3, storage system 12 may include backend data and managed data presented to a user and/or one or more applications (e.g., client applications 22, 24, 26, 28) for storage system administration. In some implementations and as will be described in greater detail below, backend data, managed data, and one or more dependencies associated with backend data and/or managed data may be, for example purposes only, represented in a dependency graph (e.g., dependency graph 300). As will be discussed in greater detail below, one or more dependencies may be represented by one or more arrows between various components of the dependency graph (e.g., dependency graph 300).

In some implementations, backend data may include a plurality of backend objects (e.g., backend objects 302, 304, 306, 308, 310, 312, 314) of and/or associated with a plurality of backend objet types (e.g., backend object types B1 316, B2 318, B3 320, B4 322, B5 324, B6 326). In some implementations, the plurality of backend object types may generally be classes or models that may describe one or more behaviors, attributes, and/or states that a backend object of a given backend object type may support. In some implementations, backend object types may generally include but are not limited to volumes, RAID groups, disks and other storage devices, Logical Unit Numbers (LUNs), consistency groups, snapshots, and other logical objects or logical object types that may describe the organization of software and/or hardware components in storage system 12. A LUN may generally be a unit of logical storage. In some implementations, backend objects may participate in IO operations (e.g., IO request 20). In some implementations, backend objects or backend object instances may generally include one or more instances of the plurality of backend object types with one or more values defined for the one or more behaviors, attributes, and/or states for a given backend object type, (e.g., a disk backend object of the disk backend object type, a volume backend object instance of the volume backend object type, etc.). In some implementations, the organization of and attributes of the plurality of backend objects and/or backend object types may not be accessible or exposed to a user (e.g., via client applications 22, 24, 26, 28). In some implementations, the plurality of backend objects may be stored in data array 212.

In some implementations, managed data may include a plurality of managed objects (e.g., managed objects 328, 330, 332, 334, 336, 338, 340) of and/or associated with a plurality of managed object types (e.g., managed object types M1 342, M2 344, M3 346, M4 348, M5 350, M6 352). In some implementations, the plurality of managed object types may generally be classes that may describe behaviors and/or states that a managed object of a given managed object type may support. Managed object types may generally include but are not limited to Logical Unit Numbers (LUNs), disks or other storage devices, storage pools, file systems, volumes, snapshots, physical devices such as disks and other storage devices, and other higher level data object types that may describe the organization of software and/or hardware components in storage system 12. Managed objects or managed object instances may generally include one or more instances of the plurality of managed object types, (e.g., one or more LUNs of the LUN type, one or more storage pools of the storage pool type, etc.). In some implementations, the plurality of managed objects and/or managed object types may mask the organization and/or composition of backend objects and/or backend object types from users and/or hosts by providing an organization of managed objects and/or managed object types that may be monitored by or configured by a user and/or one or more applications (e.g., client applications 22, 24, 26, 28). As will be discussed in greater detail below, the plurality managed objects and/or managed object types may depend upon the plurality of backend objects and/or backend object types. In some implementations, the plurality of managed objects may be stored in storage processor 200. In some implementations, the plurality of managed objects may be stored in a managed object database (e.g., managed object database 226).

In some implementations, managed data (e.g., managed objects 328, 330, 332, 334, 336, 338, 340) may depend on backend data (e.g., backend objects 302, 304, 306, 308, 310, 312, 314). For example, a plurality of managed object types (e.g., managed object types M1 342, M2 344, M3 346, M4 348, M5 350, M6 352) may depend on a plurality of backend object types (e.g., backend object types B1 316, B2 318, B3 320, B4 322, B5 324, B6 326). Additionally, a plurality of managed objects (e.g., managed objects 328, 330, 332, 334, 336, 338, 340) may depend upon a plurality of backend objects (e.g., backend objects 302, 304, 306, 308, 310, 312, 314). For example, one or more backend objects (e.g., backend object 304) may represent, for example purposes only, one or more RAID groups of a "RAID group" backend data object type (e.g., backend object type B1 316). In some implementations, one or more managed objects (e.g., managed object 330) which may, for example purposes only, represent one or more file systems of a "file system" managed object type (e.g., managed object type M1 342) may be created (e.g., by a client application 22, 24, 26, 28) and may depend upon the one or more RAID group backend objects (e.g., backend object 304). It will be appreciated that various managed objects may depend upon various backend objects within the scope of the present disclosure.

In some implementations, various applications (e.g., client applications 22, 24, 26, 28) may access and/or interact with a plurality of managed objects. As discussed above, a plurality of managed objects may be created from and/or otherwise may depend on one or more backend objects. As will be discussed in greater detail below, the dependencies associated with the plurality of managed objects and the plurality of backend objects may be specified by the various applications (e.g., client applications 22, 24, 26, 28) accessing or interacting with the plurality of managed objects.

As will be discussed in greater detail below, in some implementations, backend data may change independently of managed data. In some implementations the managed data that depends upon the backend data may need to be synced up with the latest backend data and made available to a user and/or storage administrator as a consistent set.

In some implementations and for example purposes only, assume that storage system 12 is configured as an application server. If and when storage system 12 or system processor 200 is offline, one or more changes may be made to the backend data. Once storage system 12 or storage processor 200 is online, the managed data that depends upon the backend data may need to be synced up with the latest backend data and made available to a user and/or storage administrator as a consistent set.

Figure 4:
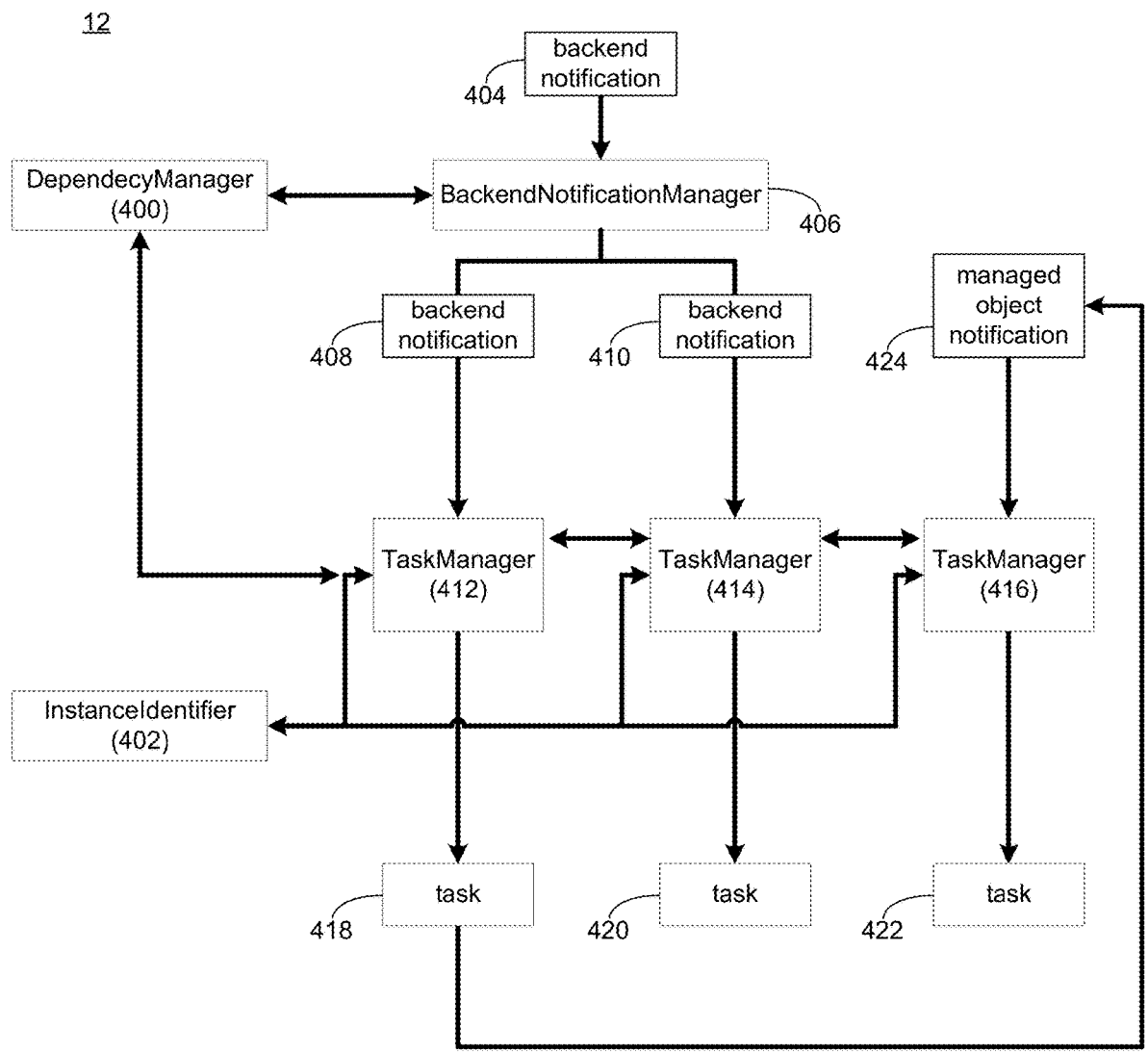
FIG. 4 is an example diagrammatic view of the storage system of FIG. 1 according to one or more example implementations of the disclosure.
Figure 5:
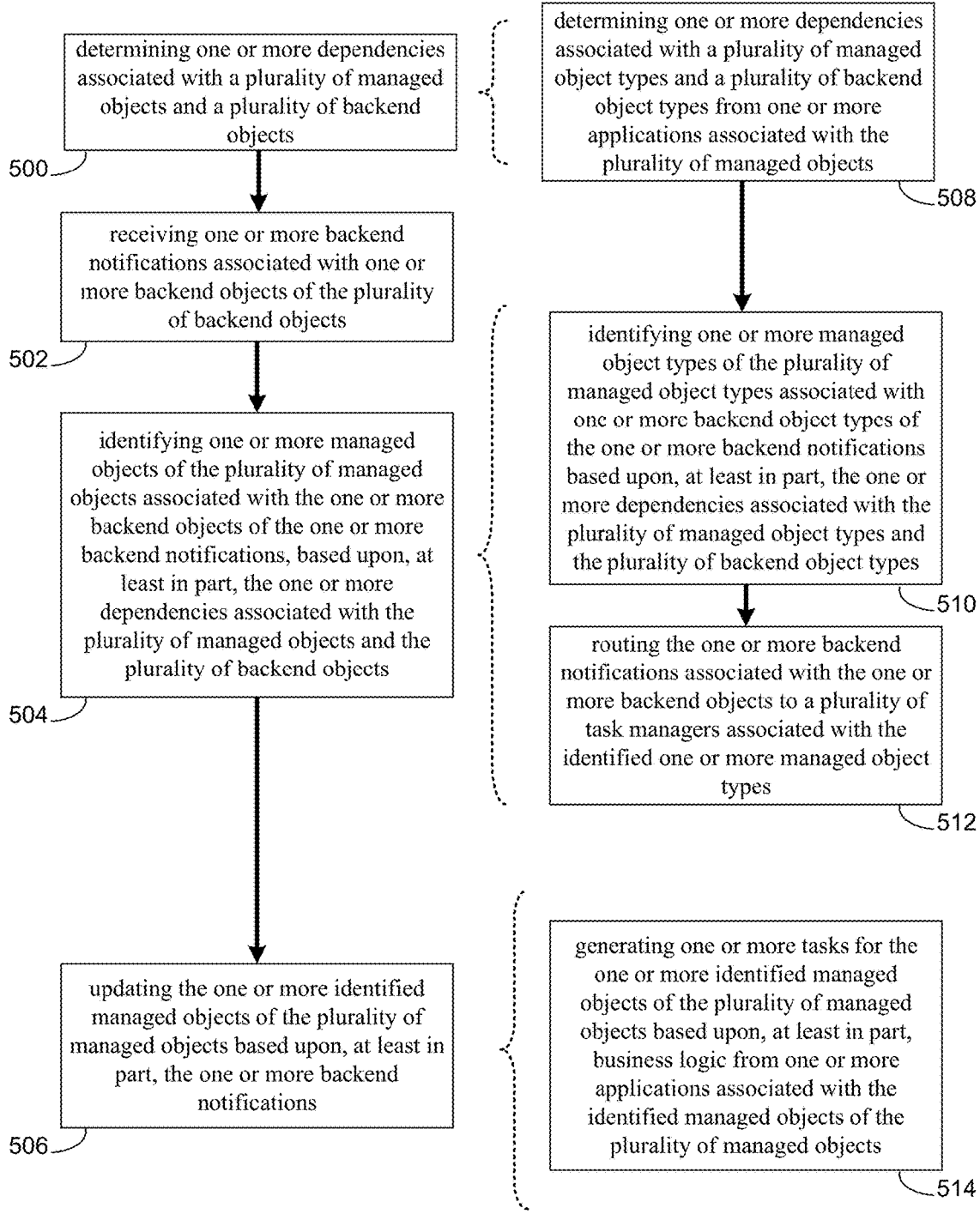
FIG. 5 is an example flowchart of a data management process of FIG. 1 according to one or more example implementations of the disclosure.

The Data Management Process:

As discussed above and referring also to the example implementations of FIGS. 3-5, data management process 10 may determine 500 one or more dependencies associated with a plurality of managed objects and a plurality of backend objects. Data management process 10 may receive 502 one or more backend notifications associated with one or more backend objects of the plurality of backend objects. Data management process 10 may identify 504 one or more managed objects of the plurality of managed objects associated with the one or more backend objects of the one or more backend notifications, based upon, at least in part, the one or more dependencies associated with the plurality of managed objects and the plurality of backend objects. Data management process 10 may update 506 the one or more identified managed objects of the plurality of managed objects based upon, at least in part, the one or more backend notifications.

In some implementations, data management process 10 may determine 500 one or more dependencies associated with a plurality of managed objects and a plurality of backend objects. Examples of dependencies associated with the plurality of managed objects and the plurality of backend objects may include but are not limited to dependencies between a plurality of managed objects and a plurality of backend objects, dependencies between a plurality of managed object types and backend object types, dependencies between at least two managed object types, dependencies between at least two backend object types, between at least two managed objects, and/or dependencies between at least two backend objects.

In some implementations, determining the one or more dependencies associated with a plurality of managed objects and a plurality of backend objects may include determining 508 one or more dependencies associated with a plurality of managed object types and a plurality of backend object types from one or more applications associated with the plurality of managed object types. In some implementations, data management process 10 may receive the one or more dependencies associated with the plurality of managed object types and the plurality of backend object types from various applications (e.g., client applications 22, 24, 26, 28). For example, data management process 10 may determine the one or more dependencies associated with a plurality of managed objects and a plurality of backend objects from one or more applications by executing a set of application programmable interfaces (APIs), programs, and/or processes configured to determine the one or more object or class dependencies from the plurality of applications. Data management process 10 may receive the one or more dependencies associated with a plurality of managed objects and a plurality of backend objects from the one or more applications (e.g., client applications 22, 24, 26, 28) in response to executing the set of application programmable interfaces (APIs). Accordingly, the one or more applications (e.g., via data management process 10) may specify the one or more dependencies between the plurality of managed object types and the plurality of backend object types.

In some implementations, data management process 10 may register the one or more dependencies associated with the plurality of managed object types and the plurality of backend object types. In some implementations, data management process 10 may register the one or more dependencies associated with a plurality of backend objects, a plurality of backend object types, a plurality of managed objects, and/or a plurality of managed object types of storage system 12 in a dependency graph (e.g., dependency graph 300). It will be appreciated that other data structures may be used to register the dependencies within the scope of the present disclosure. In some implementations, data management process 10 may register the one or more dependencies in a cache, database, storage device, software module, etc. (e.g., DependencyManager 400). Accordingly, in some implementations, DependencyManager 400 may manage (e.g., via data management process 10) the one or more dependencies. In some implementations, DependencyManager 400 may interact with and/or register the one or more dependencies in dependency graph 300.

For example and as discussed above, storage system 12 may include a plurality of backend objects (e.g., backend objects 302, 304, 306, 308, 310, 312, 314) of backend object types (e.g., backend object types B1 316, B2 318, B3 320, B4 322, B5 324, B6 326) and a plurality of managed objects (e.g., managed objects 328, 330, 332, 334, 336, 338, 340) of a plurality of managed object types (e.g., managed object types M1 342, M2 344, M3 346, M4 348, M5 350, M6 352). In some implementations, data management process 10 may determine that managed object type M1 342 depends upon backend object type B1 316 by receiving the one or more dependencies from one or more applications (e.g., client applications 22, 24, 26, 28) associated with managed object 330. Accordingly, data management process 10 may register the dependency between managed object type M1 342 and backend object type B1 316 in DependencyManager 400.

In some implementations, data management process 10 may determine one or more dependencies between at least two managed object types of the plurality of managed object types. In some implementations and as discussed above, various applications (e.g., client applications 22, 24, 26, 28) may define dependencies between at least two managed object types. For example, data management process 10 may receive the one or more dependencies between at least two managed object types from various applications (e.g., client applications 22, 24, 26, 28) via, for example, a set of APIs. In some implementations, data management process 10 may determine that managed object type M6 352 depends on managed object type M4 348 by receiving the one or more dependencies from one or more applications (e.g., client applications 22, 24, 26, 28) associated with managed object type M6 352 and managed object type M4 348. In some implementations, data management process 10 may register the dependency between managed object type 352 and managed object type 348 in DependencyManager 400.

In some implementations, data management process 10 may determine one or more dependencies between at least two backend object types of the plurality of backend object types. For example, data management process 10 may determine a dependency between backend object type B3 320 and backend object type B2 318. Additionally, in some implementations, data management process 10 may determine dependencies between at least two backend objects of the plurality of backend objects. For example, data management process 10 may determine a dependency between backend object 308 and backend object 306. In some implementations, data management process 10 may register the dependency between backend object type B3 320 and backend object type B2 318 in DependencyManager 400. Additionally, data management process 10 may register the dependency between backend object 308 and backend object 306 in DependencyManager 400.

In some implementations, determining the one or more dependencies may be based upon, at least in part, business logic from one or more applications associated with the plurality of managed objects. In some implementations, business logic (e.g., business logic 228) from one or more applications (e.g., client applications 22, 24, 26, 28) associated with the plurality of managed objects may generally describe one or more effects that one or more changes to a plurality of backend objects may have on a plurality of managed objects. In some implementations, business logic (e.g., business logic 228) may generally describe the mapping of managed objects (e.g., managed objects 328, 330, 332, 334, 336, 338, 340) to backend objects (e.g., backend objects 302, 304, 306, 308, 310, 312, 314). In some implementations, the business logic (e.g., business logic 228) may be received from one or more applications (e.g., client applications 22, 24, 26, 28) by executing a set of APIs, programs, and/or processes configured to map the plurality of managed objects (e.g., managed objects 328, 330, 332, 334, 336, 338, 340) associated with the one or more applications (e.g., client applications 22, 24, 26, 28) to the plurality of backend objects (e.g., backend objects 302, 304, 306, 308, 310, 312, 314). In some implementations, business logic may generally define how a plurality of backend objects may be transformed into a plurality of managed objects for one or more applications (e.g., client applications 22, 24, 26, 28).

In some implementations, data management process 10 may determine that managed object 330 of managed object type M1 342 depends upon backend object 304 of backend object type B1 316 based upon, at least in part, business logic (e.g., business logic 228) from one or more applications (e.g., client applications 22, 24, 26, 28) associated with managed object 330 and/or managed object type 342. Additionally, data management process 10 may determine that managed object 336 of managed object type M4 348 and managed object 338 of managed object type M5 350 depend upon backend object 326 of backend object type B6 326 based upon, at least in part, business logic (e.g., business logic 228) from one or more applications (e.g., client applications 22, 24, 26, 28) associated with managed object 336 and/or managed object type 338. Accordingly, data management process 10 may register the dependencies between managed object 330 and backend object 304, managed object 336 and backend object 326, and managed object 338 and backend object 326 in DependencyManager 400. In some implementations, data manager process 10 may register the dependencies between managed object 330 and backend object 304, managed object 336 and backend object 326, and managed object 338 and backend object 326 in a separate module (e.g., InstanceIdentifier 402).

In some implementations, data management process 10 may register dependencies between at least two managed objects of the plurality of managed objects. For example, data management process 10 may determine that managed object 340 of managed object type M6 352 depends upon managed object 336 of managed object type M4 348 based upon, at least in part, business logic (e.g., business logic 228) from one or more applications (e.g., client applications 22, 24, 26, 28) associated with managed objects 336, 340. Accordingly, data management process 10 may register the dependency between managed object 340 and managed object 336 in DependencyManager 400 and/or InstanceIdentifier 402.

In some implementations, data management process 10 may determine the one or more dependencies associated with a plurality of managed objects and a plurality of backend objects as described above, during, for example, startup of storage system 12 and/or storage processor 200. As discussed above, in some implementations, storage system 12 may be configured as an application server. In some implementations when storage system 12 or storage processor 200 of storage system 12 is down, one or more backend objects may change. In some implementations, data management process 10 may determine the one or more dependencies during startup or initialization of storage system 12 and/or storage processor 200.

In some implementations, data management process 10 may detect one or more cyclic dependencies associated with the plurality of managed objects and the plurality of backend objects and may flag the one or more cyclic dependencies as one or more errors.

In some implementations, data management process 10 may receive 502 one or more backend notifications associated with one or more backend objects of the plurality of backend objects. In some implementations, the one or more backend notifications (e.g., backend notification 404) may generally describe a change to at least one backend object. In some implementations, data management process 10 may generate the one or more backend notifications (e.g., backend notification 404). In some implementations, storage system 12 (e.g., via storage processor 200) may generate the one or more backend notifications (e.g., backend notification 404). For example purposes only, suppose backend object 314 of backend object type B6 326 changes and that one or more backend notifications (e.g., backend notification 404) are received. In some implementations, the one or more backend notifications may specify that backend object 314 of backend object type B6 326 has changed.

In some implementations, the one or more backend notifications may describe how backend object 314 of backend object type B6 326 has changed. As discussed above, in some implementations, backend objects may generally be instances of a backend object type with one or more behaviors, attributes, and/or states defined with one or more values. A backend notification or backend object change event may include any changes in the one or more behaviors, attributes, and/or states of the backend object and/or any changes in the one or more values of the one or more behaviors, attributes, and/or states of the backend object. For example, data management process 10 may receive one or more backend notifications (e.g., backend notification 404) in response to a change in the size of a volume backend object. In this example, the backend notification may include a new size or a new value for a size attribute of the volume backend object. In some implementations, management process 10 may receive one or more backend notifications (e.g., backend notification 404) in response to a change in the availability of a disk backend object (e.g., disk backend object is offline). In this example, the backend notification may include a new operational state or a new value for an operation state of the disk backend object.

In some implementations, the one or more backend notifications may be received during run-time or while storage system 12 is operational. For example, data management process 10 may receive the one or more backend notifications indicating that one or more backend objects have changed during operation of storage system 12.

In some implementations, the one or more backend notifications may be received by a backend notification manager (e.g., BackendNotificationManager 406). As will be discussed in greater detail below, BackendNotificationManager 406 may be configured to receive (e.g., via data management process 10) the one or more backend notifications (e.g., backend notification 404) and replicate or clone (e.g., via data management process 10) the one or more backend notifications (e.g., backend notifications 408, 410, 412).

In some implementations, data management process 10 may identify 504 one or more managed objects of the plurality of managed objects associated with the one or more backend objects of the one or more backend notifications, based upon, at least in part, the one or more dependencies associated with the plurality of managed objects and the plurality of backend objects. As discussed above, the plurality of managed objects may be dependent upon a plurality of backend objects and/or a plurality of other managed objects. In some implementations, data management process 10 may consult or reference the one or more dependencies associated with the plurality of managed objects (e.g., managed objects 328, 330, 332, 334, 336, 338, 340) and the plurality of backend objects (e.g., backend objects 302, 304, 306, 308, 310, 312, 314) to associate one or more managed objects of the plurality of managed objects associated with the one or more backend objects of the one or more backend notifications. In some implementations, BackendNotificationManager 406 may identify 504 (e.g., via data management process 10) one or more managed objects associated with the one or more backend objects of the one or more backend notifications by referencing or consulting DependencyManager 400 (e.g., as represented by the arrow between BackendNotificationManager 406 and DependencyManager 400).

In some implementations, identifying 504 the one or more managed objects may include identifying 510 one or more managed object types of the plurality of managed object types associated with one or more backend object types of the one or more backend notifications based upon, at least in part, the one or more dependencies associated with the plurality of managed object types and the plurality of backend object types. As discussed above, in some implementations, data management process 10 may identify one or more managed object types of the plurality of managed object types associated with the one or more backend object types of the one or more backend notifications by determining the dependencies associated with the one or more backend object types of the one or more backend notifications and the one or more managed object types registered in DependencyManager 400.

Returning to the above example, assume for example purposes only that data management process 10 receives the one or more backend notifications that specify that backend object 314 of backend object type B6 326 has changed, BackendNotificationManager 406 (e.g., via data management process 10) may consult with and/or reference DependencyManager 400 to identify managed object types M4 348, M5 350, M6 352 as being associated with and/or dependent upon backend object type B6 326 based upon, at least in part, the one or more dependencies associated with managed object types M1 342, M2 344, M3 346, M4 348, M5 350, M6 352 and backend object types B1 316, B2 318, B3 320, B4 322, B5 324, B6 326. For example, data management process 10 may determine that managed object types M4 348, M5 350 depends on backend object type B6 326. Data management process 10 may determine that managed object type M6 352 depends on managed object types M4 348, M5 350.

In some implementations, identifying 502 the one or more managed objects may include routing 512 the one or more backend notifications associated with the one or more backend objects to a plurality of task managers associated with the identified one or more managed object types. In some implementations, one or more task managers (e.g., task managers 412, 414, 416) may be associated with one or more managed object types (e.g., managed object types M1 342, M2 344, M3 346, M4 348, M5 350, M6 352). In some implementations, task manager 412 may be associated with managed object type M4 348, task manager 414 may be associated with managed object type M5 350, and task manager 416 may be associated with managed object type M6 352. While three task managers have been described, it will be appreciated that more or less task managers may be used without departing from the scope of the present disclosure.

In some implementations, BackendNotificationManager 406 may generate (e.g., via data management process 10) one or more replicated backend notifications (e.g., backend notifications 408, 410) and route (e.g., via data management process 10) the one or more replicated backend notifications to the plurality of task managers (e.g., task managers 412, 414, 416) associated with the plurality of managed object types (e.g., managed object types M1 342, M2 344, M3 346, M4 348, M5 350, M6 352). In some implementations, BackendNotificationManager 406 may route (e.g., via data management process 10) the one or more replicated backend notifications to one or more task managers (e.g., task managers 412, 414, 416) of the plurality of task managers associated with the one or more identified managed object types.

Returning to the above example, assume for example purposes only that data management process 10 has identified managed object types M4 348, M5 350 as being associated with and/or dependent upon backend object type B6 326 of the one or more backend notifications 404, BackendNotificationManager 406 may route 512 (e.g., via data management process 10) the one or more replicated backend notifications (e.g., backend notifications 408, 410) to one or more task managers of the plurality of task managers (e.g., task managers 412, 414) associated with the one or more identified managed object types (e.g., managed object types M4 348, M5 350). Accordingly, data management process 10 may route the one or more replicated backend notifications (e.g., backend notifications 408, 410) to one or more task managers associated with the one or more identified managed object types (e.g., managed object types M4 348, M5 350).

In some implementations, identifying 502 the one or more managed objects may include identifying one or more managed object of the plurality of managed objects associated with one or more backend objects of the one or more backend notifications based upon, at least in part, the business logic from the one or more applications associated with the plurality of managed objects. As discussed above, in some implementations, business logic (e.g., business logic 228) from the one or more applications (e.g., client applications 22, 24, 26, 28) associated with the plurality of managed objects may describe one or more effects that one or more changes to a plurality of backend objects may have on a plurality of managed objects and/or may be used to map a plurality of managed objects to a plurality of backend objects. In some implementations, data management process 10 may identify one or more managed objects or managed object instances of the plurality of managed objects associated with the one or more backend objects or backend object instances of the one or more backend notifications based upon, at least in part, the business logic (e.g., business logic 228) registered in DependencyManager 400 and/or InstanceIdentifier 402.

Returning to the above example, assume for example purposes only that data management process 10 receives 502 the one or more backend notifications (e.g., backend notification 404) that specify that backend object 314 of backend object type B6 326 has changed. The plurality of task managers (e.g., task managers 412, 414, 416) may consult with and/or reference (e.g., via data management process 10) DependencyManager 400, InstanceIdentifier 402, and/or other task managers (e.g., task managers 412, 414, 416) to identify managed objects 336, 338 as being associated with and/or dependent upon backend object 314 of the one or more replicated backend notifications (e.g., backend notifications 408, 410, 412) based upon, at least in part, the business logic (e.g., business logic 228) from the one or more applications (e.g., client applications 22, 24, 26, 28) associated with managed objects 336, 338.

In some implementations, data management process 10 may identify 502 managed object 340 as being associated with and/or dependent upon managed object type 336 based upon, at least in part, the business logic (e.g., business logic 228) registered in DependencyManager 400 and/or InstanceIdentifier 402. Accordingly, task manager 412 may identify 504 (e.g., via data management process 10) managed object 336 of managed object type M4 348 and/or task manager 414 may identify 504 (e.g., via data management process 10) managed object 338 of managed object type M5 350 as being associated with backend object 314 of backend object type B6 326 of the one or more backend notifications (e.g., backend notification 404). In some implementations, the one or more identified managed objects may be impacted by a change to the one or more backend objects of the one or more backend notifications.

In some implementations, data management process 10 may update 506 the one or more identified managed objects of the plurality of managed objects based upon, at least in part, the one or more backend notifications. In some implementations, data management process 10 may compare the one or more backend objects (e.g., backend objects 314) of the one or more backend notifications (e.g., backend notifications 404) with the one or more identified managed objects (e.g., managed objects 336, 338, 340) to determine how to update the one or more identified managed objects based upon, at least in part, the change to backend object 314 specified in backend notification 404.

In some implementations, the plurality of task managers (e.g., task manager 412, 414, 416) may determine how to update the one or more identified managed objects based upon, at least in part, the change to backend object 314 specified in backend notification 404. For example, task manager 412 associated with managed object type M4 348 may determine how to update managed object 336. In some implementations, task manager 414 associated with managed object type M5 350 may determine how to update managed object 338. 412. In some implementations, the plurality of task managers (e.g., task managers 412, 414, 416) may compare (e.g., via data management process 10) the one or more backend objects (e.g., backend object 314) of the one or more backend notifications (e.g., backend notification 404) with the one or more identified managed objects to determine how to update the one or more identified managed objects (e.g., managed objects 336, 338) based upon, at least in part, the change to backend object 314 specified in backend notification 404.

In some implementations, updating 506 the one or more identified managed objects may include generating 514 one or more tasks for the one or more identified managed objects of the plurality of managed objects based upon, at least in part, business logic from one or more applications associated with the identified managed objects of the plurality of managed objects. In some implementations, data management process 10 may determine which tasks (e.g., tasks 418, 420, 422) or operations to perform on the plurality of identified managed objects to update the managed objects based upon, at least in part, the change to the one or more backend objects of the one or more backend notifications (e.g., backend notification 504). For example purposes only, tasks (e.g., tasks 418, 420, 422) for the plurality of managed objects may generally include creating, modifying, deleting, etc. the plurality of managed objects (e.g., managed objects 328, 330, 332, 334, 336, 338, 340).

In some implementations, data management process 10 may generate 514 the one or more tasks (e.g., tasks 418, 420, 422) to perform on the one or more identified managed objects based upon, at least in part, the business logic associated with the plurality of managed objects. In some implementations, the plurality of task managers (e.g., task managers 408, 410, 412) may generate 514 (e.g., via data management process 10) the one or more tasks (e.g., tasks 418, 420, 422) to perform on the one or more identified managed objects based upon, at least in part, the business logic (e.g., business logic 228) associated with the plurality of managed objects (e.g., managed objects 328, 330, 332, 334, 336, 338, 340). In some implementations, task manager 414 associated with managed object type M4 348 may generate (e.g., via data management process 10) one or more tasks (e.g., task 418) for managed object 336 based upon, at least in part, the business logic (e.g., business logic 228) associated with managed object 336 to update managed object 336 in response to the change to backend object 314. In some implementations, task manager 416 associated with managed object type M5 350 may generate (e.g., via data management process 10) one or more tasks (e.g., task 420) for managed object 338 based upon, at least in part, the business logic (e.g., business logic 228) associated with managed object 338 to update managed object 338 in response to the change to backend object 314.

In some implementations, data management process 10 may perform one or more of the one or more generated tasks to update the one or more identified managed objects. In some implementations, performing the one or more tasks (e.g., tasks 418, 420) on the one or more identified managed objects may include generating one or more managed object notifications 424 and routing the one or more managed object notifications to the plurality of task managers. In some implementations, a managed object notification or change event (e.g., managed object notifications 424) may, similarly to the backend notification, describe how a managed object (e.g., managed object 336) of a managed object type (e.g., managed object type M4 348) has changed (e.g., in response to the change in backend object 314 and/or in response to other changes). In some implementations, managed object 336 may change (e.g., via data management process 10) in response to a change in backend object 314. In some implementations, data management process 10 may determine that managed object type M6 352 depends upon managed object type M4 348. In some implementations, data management process 10 may generate (e.g., at task manager 412 associated with managed object type M4 348) one or more managed object notifications (e.g., managed object notification 424) and route the one or more managed object notifications to task manager 416 associated with managed object type M6 352 based upon, at least in part, the dependency between managed object type M4 348 and managed object type M6 352.

In some implementations, task manger 416 may identify 504 (e.g., via data management process 10) managed object 340 of managed object type M6 352 based upon, at least in part, one or more managed object notifications (e.g., managed object notifications 424) routed to the plurality of task managers and the business logic (e.g., business logic 228) registered in DependencyManager 400 and/or InstanceIdentifier 402.

As discussed above, task manager 416 associated with managed object type M6 352 may determine how to update managed object 340.

In some implementations, task manager 416 associated with managed object type M6 352 may generate (e.g., via data management process 10) one or more tasks (e.g., task 424) for managed object 336 based upon, at least in part, the business logic (e.g., business logic 228) associated with managed object 336 to update managed object 336 in response to managed object notification 424 generated by task manager 412 in response to managed object notification 424.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, executed on a computing device, comprising:
    determining, at the computing device, one or more dependencies associated with a plurality of managed objects and a plurality of backend objects, wherein the plurality of managed objects and the plurality of backend objects define, at least in part, an organization of at least one of: one or more software components and one or more hardware components in a storage system;
    receiving one or more backend notifications associated with one or more backend objects of the plurality of backend objects;
    identifying one or more managed objects of the plurality of managed objects associated with the one or more backend objects of the one or more backend notifications, based upon, at least in part, the one or more dependencies associated with the plurality of managed objects and the plurality of backend objects; and updating the one or more identified managed objects of the plurality of managed objects based upon, at least in part, the one or more backend notifications, wherein updating the one or more identified managed objects includes generating, via a plurality of task managers, one or more tasks for the one or more identified managed objects of the plurality of managed objects based upon, at least in part, business logic from one or more applications associated with the identified managed objects of the plurality of managed objects, wherein the plurality of task managers are separate from the one or more applications.

2. The computer-implemented method of claim 1, wherein determining the one or more dependencies includes determining one or more dependencies associated with a plurality of managed object types and a plurality of backend object types from one or more applications associated with the plurality of managed object types.

3. The computer-implemented method of claim 2, wherein identifying one or more managed objects includes identifying one or more managed object types of the plurality of managed object types associated with one or more backend object types of the one or more backend notifications based upon, at least in part, the one or more dependencies associated with the plurality of managed object types and the plurality of backend object types.

4. The computer-implemented method of claim 3, wherein identifying one or more managed objects includes routing the one or more backend notifications associated with the one or more backend objects to the plurality of task managers associated with the identified one or more managed object types.

5. The computer-implemented method of claim 1, wherein determining the one or more dependencies is based upon, at least in part, business logic from one or more applications associated with the plurality of managed objects.

6. The computer-implemented method of claim 1, wherein the dependencies include one or more of:
dependencies between at least one managed object of the plurality of managed objects and at least one backend object of the plurality of backend objects,
dependencies between at least two managed objects of the plurality of managed objects, and
dependencies between at least two backend objects of the plurality of backend objects.

7. A computer program product comprising on a non-transitory computer readable medium having a plurality of instructions stored thereon which, when executed across one or more processors, causes at least a portion of the one or more processors to perform operations comprising:
determining one or more dependencies associated with a plurality of managed objects and a plurality of backend objects, wherein the plurality of managed objects and the plurality of backend objects define, at least in part, an organization of at least one of: one or more software components and one or more hardware components in a storage system;
receiving one or more backend notifications associated with one or more backend objects of the plurality of backend objects;
identifying one or more managed objects of the plurality of managed objects associated with the one or more backend objects of the one or more backend notifications, based upon, at least in part, the one or more dependencies associated with the plurality of managed objects and the plurality of backend objects; and updating the one or more identified managed objects of the plurality of managed objects based upon, at least in part, the one or more backend notifications, wherein updating the one or more identified managed objects includes generating, via a plurality of task managers, one or more tasks for the one or more identified managed objects of the plurality of managed objects based upon, at least in part, business logic from one or more applications associated with the identified managed objects of the plurality of managed objects, wherein the plurality of task managers are separate from the one or more applications.

8. The computer program product of claim 7, wherein determining the one or more dependencies includes determining one or more dependencies associated with a plurality of managed object types and a plurality of backend object types.

9. The computer program product of claim 8, wherein identifying one or more managed objects includes identifying one or more managed object types of the plurality of managed object types associated with one or more backend object types of the one or more backend notifications based upon, at least in part, the one or more dependencies associated with the plurality of managed object types and the plurality of backend object types.

10. The computer program product of claim 9, wherein identifying one or more managed objects includes routing the one or more backend notifications associated with the one or more backend objects to the plurality of task managers associated with the identified one or more managed object types.

11. The computer program product of claim 7, wherein determining the one or more dependencies is based upon, at least in part, business logic from one or more applications associated with the plurality of managed objects.

12. The computer program product of claim 7, wherein the one or more dependencies include one or more of:
dependencies between at least one managed object of the plurality of managed objects and at least one backend object of the plurality of backend objects,
dependencies between at least two managed objects of the plurality of managed objects, and
dependencies between at least two backend objects of the plurality of backend objects.

13. A computing system including one or more processors and one or more memories configured to perform operations comprising:
determining one or more dependencies associated with a plurality of managed objects and a plurality of backend objects, wherein the plurality of managed objects and the plurality of backend objects define, at least in part, an organization of at least one of: one or more software components and one or more hardware components in a storage system;
receiving one or more backend notifications associated with one or more backend objects of the plurality of backend objects;
identifying one or more managed objects of the plurality of managed objects associated with the one or more backend objects of the one or more backend notifications, based upon, at least in part, the one or more dependencies associated with the plurality of managed objects and the plurality of backend objects; and updating the one or more identified managed objects of the plurality of managed objects based upon, at least in part, the one or more backend notifications, wherein updating the one or more identified managed objects includes generating, via a plurality of task managers, one or more tasks for the one or more identified managed objects of the plurality of managed objects based upon, at least in part, business logic from one or more applications associated with the identified managed objects of the plurality of managed objects, wherein the plurality of task managers are separate from the one or more applications.

14. The computing system of claim 13, wherein determining the one or more dependencies includes determining one or more dependencies associated with a plurality of managed object types and a plurality of backend object types.

15. The computing system of claim 14, wherein identifying one or more managed objects includes identifying one or more managed object types of the plurality of managed object types associated with one or more backend object types of the one or more backend notifications based upon, at least in part, the one or more dependencies associated with the plurality of managed object types and the plurality of backend object types.

16. The computing system of claim 15, wherein identifying one or more managed objects includes routing the one or more backend notifications associated with the one or more backend objects to the plurality of task managers associated with the identified one or more managed object types.

17. The computing system of claim 13, wherein determining the one or more dependencies is based upon, at least in part, business logic from one or more applications associated with the plurality of managed objects.

\* \* \* \* \*